United States Patent
Yan (10) Patent No.: US 11,234,089 B2
(45) Date of Patent: Jan. 25, 2022

(54) MICROPHONE HOLE BLOCKAGE DETECTION METHOD, MICROPHONE HOLE BLOCKAGE DETECTION DEVICE, AND WIRELESS EARPHONE

(71) Applicant: GUANGDONG OPPO MOBILE TELECOMMUNICATIONS CORP., LTD., Guangdong (CN)

(72) Inventor: Congwei Yan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/157,248

(22) Filed: Jan. 25, 2021

(65) Prior Publication Data

US 2021/0144496 A1 May 13, 2021

Related U.S. Application Data

(63) Continuation of application No. PCT/CN2019/085878, filed on May 7, 2019.

(30) Foreign Application Priority Data

Jul. 26, 2018 (CN) .......................... 201810841645.6

(51) Int. Cl.
  *H04R 29/00* (2006.01)
  *H04M 1/02* (2006.01)

(52) U.S. Cl.
  CPC ........... *H04R 29/004* (2013.01); *H04M 1/026* (2013.01)

(58) Field of Classification Search
  CPC ..................................................... H04R 29/00
  See application file for complete search history.

(56) References Cited

U.S. PATENT DOCUMENTS

| 2007/0175281 | A1 | 8/2007 | Klemenz et al. |
| 2012/0269356 | A1* | 10/2012 | Sheerin ............... H04R 29/004 381/58 |
| 2013/0222639 | A1 | 8/2013 | Oku |

(Continued)

FOREIGN PATENT DOCUMENTS

| CN | 103297909 A | 9/2013 |
| CN | 103581819 A | 2/2014 |

(Continued)

OTHER PUBLICATIONS

Chinese First Office Action with English Translation for Chinese application No. 201810841645.6, dated Sep. 4, 2020 (19 pages).

(Continued)

*Primary Examiner* — Olisa Anwah
(74) *Attorney, Agent, or Firm* — Young Basile Hanlon & MacFarlane, P.C.

(57) ABSTRACT

Disclosed in the embodiments of the present application are a microphone hole blockage detection method and a related product. The method may include: a microphone of a first wireless earphone, acquiring audio of a preset frequency band, the preset frequency band being an audible sound frequency band; determining a first volume parameter of the audio acquired by the first wireless earphone; and, on the basis of the first volume parameter, determining that the microphone of the first wireless earphone is in a blocked hole state.

18 Claims, 5 Drawing Sheets

(56) References Cited

U.S. PATENT DOCUMENTS

| | | | |
|---|---|---|---|
| 2014/0348334 A1 | 11/2014 | Ko et al. | |
| 2015/0334489 A1 | 11/2015 | Iyengar et al. | |
| 2016/0127845 A1* | 5/2016 | Cagdaser | H04R 29/004 |
| | | | 381/58 |
| 2017/0084294 A1* | 3/2017 | Hartung | G10L 25/30 |
| 2017/0272878 A1* | 9/2017 | Partio | H04R 3/04 |
| 2019/0014429 A1* | 1/2019 | Luke | H04R 29/005 |
| 2019/0069096 A1* | 2/2019 | Petersen | H04R 25/558 |
| 2019/0364375 A1* | 11/2019 | Soto | H04R 3/005 |

FOREIGN PATENT DOCUMENTS

| | | | |
|---|---|---|---|
| CN | 103929707 A | 7/2014 |
| CN | 105554202 A | 5/2016 |
| CN | 106911996 A | 6/2017 |
| CN | 107509153 A | 12/2017 |
| CN | 107659708 A | 2/2018 |
| CN | 108076199 A | 5/2018 |
| CN | 109104684 A | 12/2018 |
| EP | 3301950 A1 | 4/2018 |
| WO | 2017035771 A1 | 3/2017 |
| WO | 2017185342 A1 | 11/2017 |

OTHER PUBLICATIONS

International Search Report with English Translation for International application No. PCT/CN2019/085878, dated Jun. 30, 2019 (22 pages).

Notification to Grant Patent Right for Invention with English Translation for Chinese application No. 201810841645.6, dated Jul. 20, 2020 (4 pages).

Chinese Office Action with English Translation for CN Application 202011081647.3 dated Jul. 1, 2021. (19 pages).

Extended European Search Report for EP Application 19841680.2 dated Jul. 26, 2021. (10 pages).

* cited by examiner

MICROPHONE HOLE BLOCKAGE DETECTION METHOD, MICROPHONE HOLE BLOCKAGE DETECTION DEVICE, AND WIRELESS EARPHONE

CROSS-REFERENCE TO RELATED APPLICATION(S)

The present application is a continuation-application of International (PCT) Patent Application No. PCT/CN2019/085878, filed on May 7, 2019, which claims foreign priority of Chinese Patent Application No. 201810841645.6, filed on Jul. 26, 2018, the entire contents of both of which are hereby incorporated by reference.

TECHNICAL FIELD

The described embodiments relate to a terminal technology, and more particularly, to a microphone hole blockage detection method, a microphone hole blockage detection device, and a wireless earphone.

BACKGROUND

With massive popularity and rapid development of mobile terminals (for example, smart phones), a variety of earphones have become devices that people often use to listen to media. Moreover, earphone cord of wired earphones is often damaged, which shortens the life of the earphones, to case higher cost. Thereby, wireless earphones came into being.

Currently, people often find that holes of a microphone are blocked, such as dust blocking, water droplets blocking, and so on. This causes voice data obtained by a wireless earphone through the microphone to have intermittent sound and low volume, and affects normal use of a user.

SUMMARY

The embodiment of the present disclosure provides a microphone hole blockage detection method and related products, which may realize automatic detection of the blocked hole state of a wireless earphone microphone.

The present disclosure provides a microphone hole blockage detection method applied to a wireless earphone. The wireless earphone includes a first wireless earphone and a second wireless earphone; the first wireless earphone includes a microphone; and the method includes: acquiring audio of a preset frequency band through the microphone of the first wireless earphone, wherein the preset frequency band is a frequency band in which an audible sound is located; determining a first volume parameter of the audio acquired by the first wireless earphone; and determining whether the microphone of the first wireless earphone is in a blocked hole state according to the first volume parameter.

The present disclosure provides a microphone hole blockage detection device applied to a wireless earphone. The wireless earphone includes a first wireless earphone and a second wireless earphone. The first wireless earphone includes a microphone. The microphone hole blockage detection device includes an acquiring unit, a first determining unit, and a second determining unit; wherein the acquiring unit is configured to acquire audio of a preset frequency band through the microphone of the first wireless earphone, wherein the preset frequency band is a frequency band in which an audible sound is located; the first determining unit is configured to determine a first volume parameter of the audio acquired by the first wireless earphone; the second determining unit is configured to determine that whether the microphone of the first wireless earphone is in a blocked hole state according to the first volume parameter.

The present disclosure provides a wireless earphone, including: a processor, a memory, a first wireless earphone, a second wireless earphone, and at least one of programs; the first wireless earphone comprises a microphone; the at least one of programs are stored in the memory and configured to be executed by the processor; the at least one of programs include instructions configured to execute operations including: acquiring audio of a preset frequency band through the microphone of the first wireless earphone, wherein the preset frequency band is a frequency band in which an audible sound is located; determining a first volume parameter of the audio acquired by the first wireless earphone; and determining whether the microphone of the first wireless earphone is in a blocked hole state according to the first volume parameter.

BRIEF DESCRIPTION OF DRAWINGS

The drawings involved in the embodiments of the present disclosure will be briefly introduced below.

DETAILED DESCRIPTION

The detailed description set forth below is intended as a description of the subject technology with reference to the appended figures and embodiments. It is understood that the embodiments described here include merely some parts of the embodiments of the present disclosure, but do not include all the embodiments. Based on the embodiments of the present disclosure, all other embodiments that those skilled in the art may derive from these embodiments are within the scope of the present disclosure.

The terms "first" and "second" in the specification and claims of the present disclosure and the above-mentioned drawings are used to distinguish different objects, rather than to describe a specific sequence. In addition, the terms "including" and "having" and any variations thereof are intended to cover non-exclusive inclusion. For example, a process, method, system, product, or device that includes a series of operations or units is not limited to the listed operations or units, but optionally includes unlisted operations or units, or optionally also includes other operations or units inherent to these processes, methods, products or equipment.

Reference throughout this specification, the reference terms "an embodiment", "some embodiments", "one embodiment", "another example", "an example", "a specific example", or "some examples", and the like means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, one skilled in the art may combine the different embodiments or examples described in this specification and features of different embodiments or examples without conflicting with each other.

The present disclosure relates to a microphone hole blockage detection method applied to a wireless earphone, wherein the wireless earphone includes a first wireless earphone and a second wireless earphone; the first wireless earphone includes a microphone. The method includes: acquiring audio of a preset frequency band through the microphone of the first wireless earphone, wherein the preset frequency band is a frequency band in which an audible sound is located; determining a first volume parameter of the audio acquired by the first wireless earphone; and determining whether the microphone of the first wireless earphone is in a blocked hole state according to the first volume parameter.

In an embodiment, the determining whether the microphone of the first wireless earphone being in the blocked hole state according to the first volume parameter, includes: determining a first difference between the first volume parameter and a preset volume threshold; and when the first difference being greater than the first difference threshold is detected, determining that the first wireless earphone is in the blocked hole state.

In an embodiment, before the determining the first difference between the first volume parameter and the preset volume threshold, the method further includes: acquiring ambient volume; and determining that volume threshold corresponding to the ambient volume is the preset volume threshold.

In an embodiment, the wireless earphone is coupled to a mobile terminal; the audio is audio emitted by a speaker of the mobile terminal; before the determining the first difference between the first volume parameter and the preset volume threshold, the method further includes: determining a first distance parameter between the first wireless earphone and the mobile terminal; and acquiring the preset volume threshold corresponding to the first distance parameter.

In an embodiment, the audio is audio emitted by a speaker of the second wireless earphone according to the preset volume threshold; before the when the first difference being greater than the first difference threshold is detected, determining that the first wireless earphone is in the blocked hole state, the method further includes: determining a second distance parameter between the first wireless earphone and the second wireless earphone; and determining the first difference threshold according to the second distance parameter.

In an embodiment, the audio is audio emitted by a wearer of the first wireless earphone, and a microphone of the second wireless earphone is in a non-blocked hole state; the method further includes: controlling the microphone of the second wireless earphone to acquire the audio of the preset frequency band; determining a second volume parameter of the audio acquired by the second wireless earphone; the whether the microphone of the first wireless earphone being in the blocked hole state according to the first volume parameter, includes: determining a second difference between the first volume parameter and the second volume parameter; when the second difference is greater than the second difference threshold, determining that the microphone of the first wireless earphone is in the blocked hole state.

In an embodiment, after the determining whether the microphone of the first wireless earphone is in the blocked hole state according to the first volume parameter, the method further includes: when an acquisition instruction for voice data is detected and the first wireless earphone is in a wearing state, prompting a user to wear the second wireless earphone; when the second wireless earphone being in the wearing state is detected, disabling a microphone function of the first wireless earphone, and acquiring the voice data through the microphone of the second wireless earphone.

In an embodiment, after the acquiring the voice data through the microphone of the second wireless earphone, the method further includes: detecting that whether the second wireless earphone is a master earphone; and when the second wireless earphone being the master earphone is detected, switching the second wireless earphone to be a slave earphone and the first wireless earphone to be the master earphone.

In an embodiment, the second wireless earphone being in the wearing state being detected, includes: acquiring a posture parameter of the second wireless earphone; detecting that the second wireless earphone is in the wearing state according to the posture parameter of the second wireless earphone.

The present disclosure relates to a microphone hole blockage detection device applied to a wireless earphone, wherein the wireless earphone includes a first wireless earphone and a second wireless earphone; the first wireless earphone includes a microphone. The microphone hole blockage detection device includes an acquiring unit, a first determining unit, and a second determining unit; wherein the acquiring unit is configured to acquire audio of a preset frequency band through the microphone of the first wireless earphone, wherein the preset frequency band is a frequency band in which an audible sound is located; the first determining unit is configured to determine a first volume parameter of the audio acquired by the first wireless earphone; the second determining unit is configured to determine that whether the microphone of the first wireless earphone is in a blocked hole state according to the first volume parameter.

In an embodiment, when the first wireless earphone being in the blocked hole state is determined according to the first volume parameter, the second determining unit is further configured to determine a first difference between the first volume parameter and a preset volume threshold; and when the first difference being greater than the first difference threshold is detected, the second determining unit is configured to determine that the microphone of the first wireless earphone is in the blocked hole state.

In an embodiment, before the acquiring unit is configured to determine the first difference between the first volume parameter and the preset volume threshold, the acquiring unit is further configured to acquire ambient volume; and the second determining unit is further configured to determine that volume threshold corresponding to the ambient volume is the preset volume threshold.

In an embodiment, the wireless earphone is coupled to a mobile terminal; the audio is audio emitted by a speaker of the mobile terminal; before the second determining unit determines the first difference between the first volume parameter and the preset volume threshold, the second determining unit is further configured to determine a first distance parameter between the first wireless earphone and the mobile terminal; and the second determining unit is further configured to acquire the preset volume threshold corresponding to the first distance parameter.

In an embodiment, the audio is audio emitted by a speaker of the second wireless earphone according to the preset volume threshold; before the second determining unit detects that the first difference is greater than the first difference threshold, the second determining unit is configured to determine that the microphone of the first wireless earphone is in the blocked hole state, the second determining unit is further configured to determine a second distance parameter between the first wireless earphone and the second wireless earphone; and the second determining unit is configured to determine the first difference threshold according to the second distance parameter.

In an embodiment, the audio is audio emitted by a wearer of the first wireless earphone, and a microphone of the second wireless earphone is in a non-blocked hole state; the acquiring unit is further configured to control the microphone of the second wireless earphone to acquire the audio of the preset frequency band; the first determining unit is configured to determine a second volume parameter of the audio acquired by the second wireless earphone; when the second determining unit is configured to determine that whether the microphone of the first wireless earphone is in a blocked hole state according to the first volume parameter, the second determining unit is further configured to determine a second difference between the first volume parameter and the second volume parameter; and when the second difference is greater than the second difference threshold, the second determining unit is configured to determine that the microphone of the first wireless earphone is in the blocked hole state.

In an embodiment, the device further includes a processing unit; wherein after the first wireless earphone being in the blocked hole state according to the first volume parameter is detected, the processing unit is configured to prompt a user to wear the second wireless earphone, when an acquisition instruction for voice data is detected and the first wireless earphone is in a wearing state, the processing unit is configured to acquire the voice data through the microphone of the second wireless earphone, when the second wireless earphone being in the wearing state is detected, the processing unit is configured to disable a microphone function of the first wireless earphone.

In an embodiment, after the processing unit acquires the voice data through the microphone of the second wireless earphone, the processing unit is further configured to detect whether the second wireless earphone is a master earphone; and when the second wireless earphone being the master earphone is detected, the processing unit is further configured to switch the second wireless earphone to be a slave earphone and the first wireless earphone to be the master earphone.

In an embodiment, when the second wireless earphone being in the wearing state is detected, the processing unit is further configured to acquire a posture parameter of the second wireless earphone; and the processing unit is further configured to detect that the second wireless earphone is in the wearing state according to the posture parameter of the second wireless earphone.

The present disclosure relates to a wireless earphone. The wireless earphone includes: a processor, a memory, a first wireless earphone, a second wireless earphone, and at least one of programs; the first wireless earphone includes a microphone; the at least one of programs are stored in the memory and configured to be executed by the processor; the at least one of programs include instructions configured to execute operations including: acquiring audio of a preset frequency band through the microphone of the first wireless earphone, wherein the preset frequency band is a frequency band in which an audible sound is located; determining a first volume parameter of the audio acquired by the first wireless earphone; and determining whether the microphone of the first wireless earphone is in a blocked hole state according to the first volume parameter.

In an embodiment, the determining whether the microphone of the first wireless earphone being in the blocked hole state according to the first volume parameter, includes: determining a first difference between the first volume parameter and a preset volume threshold; and when the first difference being greater than the first difference threshold is detected, determining that the first wireless earphone is in the blocked hole state.

The present disclosure relates to a wireless earphone. The wireless earphone includes: a processor, a memory, and at least one of programs; the at least one of programs are stored in the memory and configured to be executed by the processor; the at least one of programs include instructions configured to execute operations in the above-mentioned microphone hole blockage detection method.

The present disclosure relates to a computer readable storage medium. The computer readable storage medium is configured to store a computer program for electronic data exchange; wherein the computer program is configured to execute operations in the above-mentioned microphone hole blockage detection method.

Figure 1:
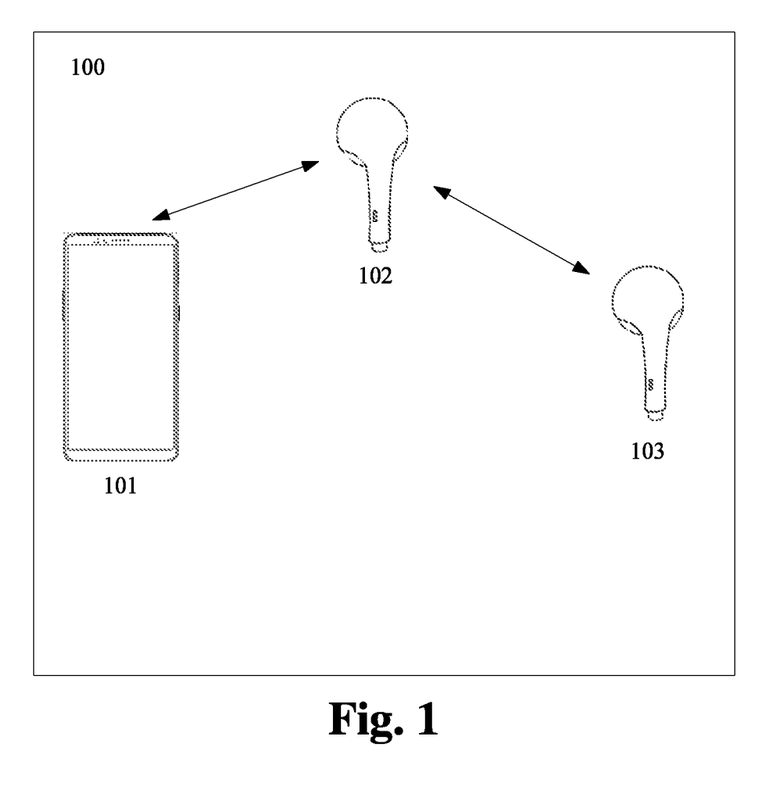
FIG. 1 is a system architecture illustration of a wireless earphone system in accordance with an embodiment in the present disclosure.

As shown in FIG. 1, an embodiment of the present disclosure provides a wireless earphone system 100, which may include a mobile terminal 101, a first wireless earphone 102, and a second wireless earphone 103. The system may use any one of the following communication mechanisms. In a first communication mechanism, the mobile terminal 101 may have established a first communication link with the first wireless earphone 102, and the first wireless earphone 102 may have established a second communication link with the second wireless earphone 103, i.e., the communication mechanism between the first wireless earphone 102 and the second wireless earphone 103 and the mobile terminal 101 may adopt a master-slave communication mechanism (e.g., a BLUETOOTH protocol may be adopted). In a second communication mechanism, the mobile terminal 101 may establish a first communication link with the first wireless earphone 102, and the mobile terminal 101 may establish a second communication link with the second wireless earphone 103, i.e., the first wireless earphone 102 and the second wireless earphone 103 may be both main earphones that directly communicate with the mobile terminal 101. The main earphone may be an earphone that directly establishes a communication link with the mobile terminal 101 to perform a preset type of data interaction. A slave earphone may be an earphone that is transferred through the main earphone and then performs a preset type of data interaction with the mobile terminal 101. The preset type of data may include media data and/or call data. The media data may be audio data and/or video data of the mobile terminal 101 other than call voice data, and the call data may be call voice data of the mobile terminal 101. The first wireless earphone 102 and the second wireless earphone 103 may be BLUETOOTH wireless earphones, and so on. The mobile terminal 101 may include various handheld devices with wireless communication functions, vehicle-mounted devices, wearable devices (such as a smart watch, a smart bracelet, a pedometer, and so on), computing devices or other processing devices coupled to wireless modems, and various forms of a user equipment (UE), a mobile station (MS), a terminal device, and so on. For easy of description, the above-mentioned devices may be collectively referred to as a mobile terminal. The embodiments of the present disclosure are described in detail in the following.

Figure 2:
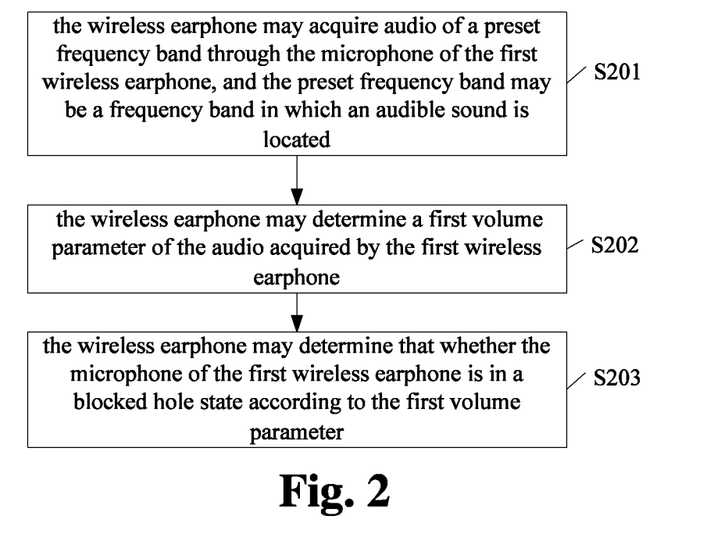
FIG. 2 is a flow chart of a microphone hole blockage detection method in accordance with an embodiment in the present disclosure.

FIG. 2 illustrates a flow chart of a microphone hole blockage detection method in accordance with an embodiment in the present disclosure, which may be applied to a wireless earphone. The wireless earphone may include a first wireless earphone and a second wireless earphone. The first wireless earphone may include a microphone. As shown in the figure, the microphone hole blockage detection method may include operations in the following blocks.

Block S201, the wireless earphone may acquire audio of a preset frequency band through the microphone of the first wireless earphone, and the preset frequency band may be a frequency band in which an audible sound is located.

The frequency band in which the audible sound is located, may be a frequency band that may be heard by a human ear between 20000 Hz and 20 Hz.

The audio of the preset frequency band acquired by the microphone may be the audio of an ambient sound, audio from the mobile terminal or a speaker of the first wireless earphone or the second wireless earphone, or a user voice obtained by the microphone when a user is using a voice or video chat application. The audio of the preset frequency band is not limited here.

Block S202, the wireless earphone may determine a first volume parameter of the audio acquired by the first wireless earphone.

The first volume parameter of the audio may be detected by a decibel detector, and a unit of the volume may be decibel.

Block S203, the wireless earphone may determine that whether the microphone of the first wireless earphone is in a blocked hole state according to the first volume parameter.

The implementation that the wireless earphone determines whether the microphone of the first wireless earphone is in a blocked hole state according to the first volume parameter, may be various. For example, the first volume parameter may be compared with a preset volume parameter. When the first volume parameter is much smaller than the preset volume parameter, the blocked hole state may be determined. The preset volume parameter may be an empirical value, which may be preset in the wireless earphone by a technical developer, and is not limited here.

The implementation that the wireless earphone determines whether the microphone of the first wireless earphone is in a blocked hole state according to the first volume parameter, may also be compared with the second volume parameter of the audio obtained by the second wireless earphone, i.e., the first wireless earphone and the second wireless earphone may simultaneously obtain the audio of the preset frequency band. In this case, the second wireless earphone may be known as in a non-blocked hole state. By comparing the first volume parameter of the audio acquired by the first wireless earphone with the second volume parameter of the audio acquired by the second wireless earphone, when the first volume parameter acquired by the first wireless earphone differs greatly from the second volume parameter acquired by the second wireless earphone, it may determine that the microphone of the first wireless earphone is in the blocked hole state. The mobile terminal may be also known as in a non-blocked hole state, it may determine that the microphone of the first wireless earphone is in the blocked hole state through the volume parameters acquired by the first wireless earphone and the mobile terminal, which is not limited here.

In this embodiment of the present disclosure, the wireless earphone may first obtain audio of the preset frequency band through the microphone of the first wireless earphone, and the preset frequency band may a frequency band in which an audible sound is located. Secondly, the first volume parameter of the audio acquired by the first wireless earphone may be determined. Finally, it may determine according to the first volume parameter that the microphone of the first wireless earphone is in the blocked hole state. The wireless earphone may obtain audio of the preset frequency band through the microphone, and the blocked hole state of the microphone may be determined according to the first volume parameter of the audio, which may be beneficial to improve convenience of the blocked hole detection. Moreover, due to universality of the audible sound, detecting the blocked hole state by acquiring the audible sound may improve time flexibility of the blocked hole detection. In addition, the entire detection process may be performed autonomously by the wireless earphone, which may realize an automatic detection of the blocked hole state of the wireless earphone microphone. It may detect that the microphone is in the blocked hole state without increasing a hardware structure, which may expand functions of the wireless earphone and improve intelligence of the blocked hole detection.

In an embodiment, the operations of determining whether the microphone of the first wireless earphone being in the blocked hole state according to the first volume parameter, may include operations in the following.

A first difference between the first volume parameter and a preset volume threshold, may be determined.

When the first difference being greater than the first difference threshold is detected, it may determine that the microphone of the first wireless earphone is in the blocked hole state.

The preset volume threshold may be a fixed value. The fixed value may be an empirical value, which is preset by a technical developer before the wireless earphone leaves the factory. The preset volume threshold may also be a dynamic value. The dynamic value may vary depending on the environment or may be changed according to different users, and so on. Different environments may cause different environmental sound interference, and then different preset volume thresholds may be determined. Different users may cause different volumes of each user's speech, and then different preset volume thresholds may be determined. The preset volume threshold may be a user's maximum volume or a user's average volume determined according to historical user volume acquisition records, and so on, which is not limited here.

In this embodiment, the wireless earphone may determine the blocked hole state of the first wireless earphone according to the first difference between the acquired audio volume parameter and the preset volume threshold. The algorithm may be simple, which may be beneficial to improve convenience of the blocked hole detection.

In this embodiment, the wireless earphone may be coupled to the mobile terminal. The audio may be audio emitted by a speaker of the mobile terminal. Before the first difference between the first volume parameter and the preset volume threshold is determined, the method may further include operations in the following.

A first distance parameter between the first wireless earphone and the mobile terminal, may be determined.

The preset volume threshold corresponding to the first distance parameter, may be acquired.

The wireless earphone may be preset with a mapping relationship between the first distance parameter and the preset volume threshold. The preset volume threshold may be obtained through the first distance parameter. The mapping relationship may be preset in the wireless earphone by a technical developer based on an empirical value before the wireless earphone leaves the factory.

The implementation that the first distance parameter between the first wireless earphone and the mobile terminal, may be determined, may be various. For example, the first volume parameter may be compared with a preset volume parameter. For example, a user may wear the first wireless earphone, and the wireless earphone may determine that whether the mobile terminal is coupled to the mobile terminal. The wireless earphone may determine the distance parameter between the mobile terminal and the first wireless earphone by determining the distance parameter between the mobile terminal and a user, or may determine signaling transmission time through signaling interaction between the first wireless earphone and the mobile terminal. The distance parameter between the first wireless earphone and the mobile terminal may be determined according to the signaling transmission time and the transmission speed, which is not limited here.

In this embodiment, when the wireless earphone receives the audio from the speaker of the mobile terminal and determines the blocked hole state according to the first volume parameter of the audio, the preset volume threshold configured to determine the blocked hole state may be determined by determining the distance from the mobile terminal. It may conform to the interaction scenario between the first wireless earphone and the mobile terminal, which is beneficial to improve accuracy of the blocked hole detection.

In an embodiment, the audio may be audio emitted by a speaker of the second wireless earphone according to the preset volume threshold. Before the first difference being greater than the first difference threshold is detected, and before the first wireless earphone being in the blocked hole state is determined, the method may further include operations in the following.

A second distance parameter between the first wireless earphone and the second wireless earphone, may be determined.

The first difference threshold according to the second distance parameter, may be determined.

The wireless earphone may be preset with a mapping relationship between the second distance parameter and the preset volume threshold. The preset volume threshold may be obtained through the second distance parameter. The mapping relationship may be preset in the wireless earphone by a technical developer based on an empirical value before the wireless earphone leaves the factory.

In this embodiment, the wireless earphone may receive audio from the speaker of the second wireless earphone according to the preset volume threshold. Therefore, detecting the blocked hole state by the difference between the first volume parameter and the preset volume threshold may be beneficial to improve the accuracy of the blocked hole detection. Moreover, the first difference threshold may be determined according to the second distance parameter of the first wireless earphone and the second wireless earphone, instead of the preset fixed first difference threshold, which may further improve the accuracy of the blocked hole detection.

In an embodiment, the audio may be audio emitted by a wearer of the first wireless earphone. The microphone of the second wireless earphone may be in a non-blocked hole state. The method may further include operations in the following.

The microphone of the second wireless earphone may be controlled to acquire the audio of the preset frequency band.

A second volume parameter of the audio acquired by the second wireless earphone, may be determined.

The operation that whether the microphone of the first wireless earphone being in the blocked hole state is determined according to the first volume parameter, may further include operations in the following.

A second difference between the first volume parameter and the second volume parameter, may be determined.

When the second difference is greater than the second difference threshold, it may determine that the microphone of the first wireless earphone is in the blocked hole state.

The second wireless earphone may be in the non-blocked hole state. The implementation that controlling the microphone of the second wireless earphone to acquire the audio of the preset frequency band, may be that the wireless earphone simultaneously controls the microphone of the first wireless earphone and the microphone of the second wireless earphone to simultaneously acquire the audio.

When the audio received by the wireless earphone is emitted by the wearer, because the wearer cannot accurately determine the volume of the audio emitted by the wearer, the second wireless earphone by may be controlled to acquire the audio together, and then the blocked hole state may be determined by determining the first volume parameter acquired by the first wireless earphone and the second volume parameter acquired by the second wireless earphone. The two wireless earphones may be in a same environment, which may help avoid environmental interference and further improve the accuracy of the blocked hole detection.

In an embodiment, after the first wireless earphone being in the blocked hole state is determined according to the first volume parameter, the method may further include operations in the following.

When an acquisition instruction for voice data is detected and the first wireless earphone is in a wearing state, a user may be prompted to wear the second wireless earphone.

When the second wireless earphone being in the wearing state is detected, a microphone function of the first wireless earphone may be disabled, and the voice data through may be acquired the microphone of the second wireless earphone.

The implementation that the acquisition instruction for voice data is detected, may be various. For example, it may receive a voice data acquisition instruction sent by the mobile terminal. The acquisition instruction may be acquisition instructions when a chat application (such as WeChat, QQ, and so on) is a foreground application. The voice data acquisition instruction may be triggered by a user long pressing the designated button on the touch screen, and so on. The voice data acquisition instruction acquired by the wireless earphone may be also detected by a user's touch or pressing operation, which is not limited here. The acquisition instruction may indicate that a user needs to record voice data.

The wireless earphone may determine the wearing state of the first wireless earphone by detecting contact with an ear contour through multiple proximity sensors or pressure sensors. The wearing state of the first wireless earphone may also be determined by the posture parameter of the first wireless earphone. The wearing state of the first wireless earphone may also be possible to determine by detecting a communication identifier of a successful communication connection with the mobile terminal. The wearing state of the first wireless earphone may also be possible to determine by detecting a music play message, and so on, which is not limited here.

The implementation that a user may be prompted to wear the second wireless earphone, may be various. For example, a user may be prompted by a voice message. A user may be prompted by a breathing light that the second wireless earphone include. A user may be prompted by a text message displayed on the display screen of the mobile terminal, and so on, which is not limited here.

The implementation that the second wireless earphone being in the wearing state is detected, may be various. For example, it may determine that the second wireless earphone is in the wearing state after the prompt is issued for a period of time. It may determine by a user's touch operation on the second wireless earphone or the mobile terminal that the second wireless earphone is in the wearing state. The touch operation may be an operation of the user double-clicking the mobile terminal or double-clicking the second wireless earphone, which is not limited here.

In this embodiment, when the acquisition instruction for voice data is detected and the first wireless earphone is in the wearing state, the user may be prompt to wear the second wireless earphone. When the second wireless earphone being in the wearing state is detected, the microphone function of the first wireless earphone may be disabled, and the voice data through may be acquired the microphone of the second wireless earphone. It may be beneficial to improve integrity of voice data acquisition and reduce power consumption of the first wireless earphone.

In an embodiment, after the voice data may be acquired through the microphone of the second wireless earphone, the method may further include operations in the following.

Whether the second wireless earphone is a master earphone, may be detected.

When the second wireless earphone being the master earphone is detected, the second wireless earphone may be switched to be a slave earphone and the first wireless earphone may be switched to be the master earphone.

In this embodiment, when the wireless earphone determines that the microphone hole is blocked, the microphone function of the first wireless earphone may be disabled, and the microphone of the second wireless earphone may be used instead, which may cause the second wireless earphone to consume more power. Therefore, switching the second wireless earphone to the slave earphone may reduce the power consumption and energy consumption caused by a greater number of communication interactions of the master earphone, and may increase use time of the second wireless earphone.

Figure 3:
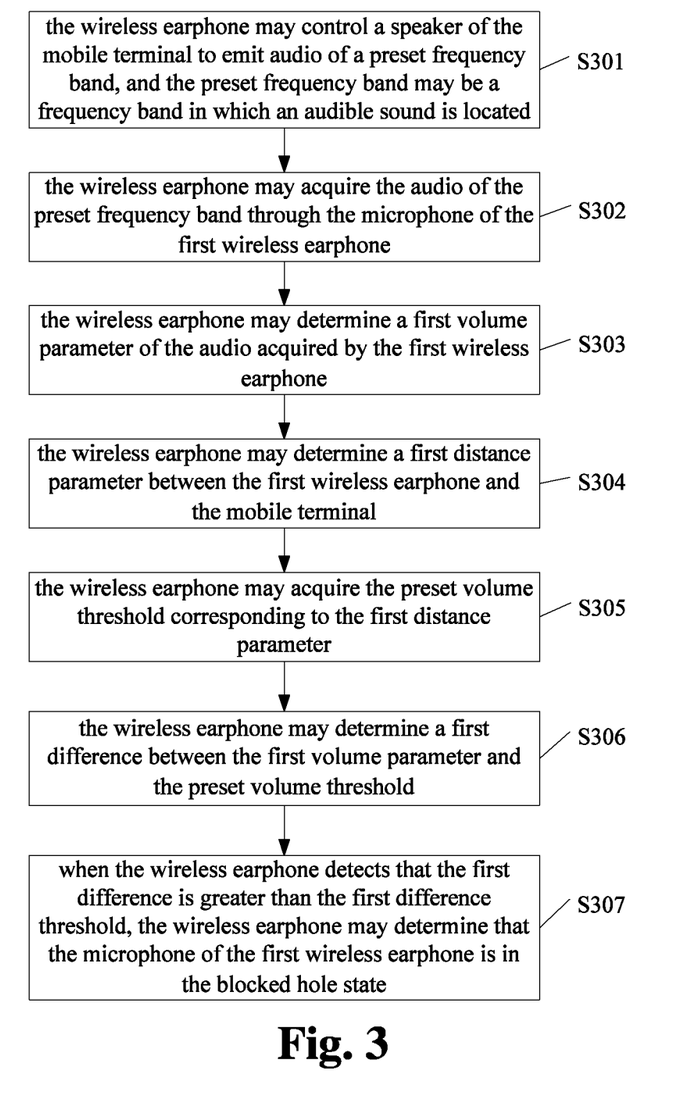
FIG. 3 is a flow chart of a microphone hole blockage detection method in accordance with an embodiment in the present disclosure.

In an embodiment same as the embodiment shown in FIG. 2, FIG. 3 illustrates a flow chart of a microphone hole blockage detection method in accordance with an embodiment in the present disclosure, which may be applied to a wireless earphone. The wireless earphone may include a first wireless earphone and a second wireless earphone. The first wireless earphone may include a microphone. As shown in the figure, the microphone hole blockage detection method may include operations in the following blocks.

Block S301, the wireless earphone may control a speaker of the mobile terminal to emit audio of a preset frequency band, and the preset frequency band may be a frequency band in which the audible sound is located.

Block S302, the wireless earphone may acquire the audio of the preset frequency band through the microphone of the first wireless earphone.

Block S303, the wireless earphone may determine a first volume parameter of the audio acquired by the first wireless earphone.

Block S304, the wireless earphone may determine a first distance parameter between the first wireless earphone and the mobile terminal.

Block S305, the wireless earphone may acquire the preset volume threshold corresponding to the first distance parameter.

Block S306, the wireless earphone may determine a first difference between the first volume parameter and the preset volume threshold.

Block S307, when the wireless earphone detects that the first difference is greater than the first difference threshold, the wireless earphone may determine that the microphone of the first wireless earphone is in the blocked hole state.

In this embodiment of the present disclosure, the wireless earphone may first obtain audio of the preset frequency band through the microphone of the first wireless earphone, and the preset frequency band may a frequency band in which an audible sound is located. Secondly, the first volume parameter of the audio acquired by the first wireless earphone may be determined. Finally, it may determine according to the first volume parameter that the microphone of the first wireless earphone is in the blocked hole state. The wireless earphone may obtain audio of the preset frequency band through the microphone, and the blocked hole state of the microphone may be determined according to the first volume parameter of the audio, which may be beneficial to improve convenience of the blocked hole detection. Moreover, due to universality of the audible sound, detecting the blocked hole state by acquiring the audible sound may improve time flexibility of the blocked hole detection. In addition, the entire detection process may be performed autonomously by the wireless earphone, which may realize an automatic detection of the blocked hole state of the wireless earphone microphone. It may detect that the microphone is in the blocked hole state without increasing a hardware structure, which may expand functions of the wireless earphone and improve intelligence of the blocked hole detection.

In addition, when the wireless earphone receives the audio from the speaker of the mobile terminal and determines the blocked hole state according to the first volume parameter of the audio, the preset volume threshold configured to determine the blocked hole state may be determined by determining the distance from the mobile terminal. It may conform to the interaction scenario between the first wireless earphone and the mobile terminal, which is beneficial to improve accuracy of the blocked hole detection.

In addition, the wireless earphone may determine the blocked hole state of the first wireless earphone according to the first difference between the acquired audio volume parameter and the preset volume threshold. The algorithm may be simple, which may be beneficial to improve convenience of the blocked hole detection.

Figure 4:
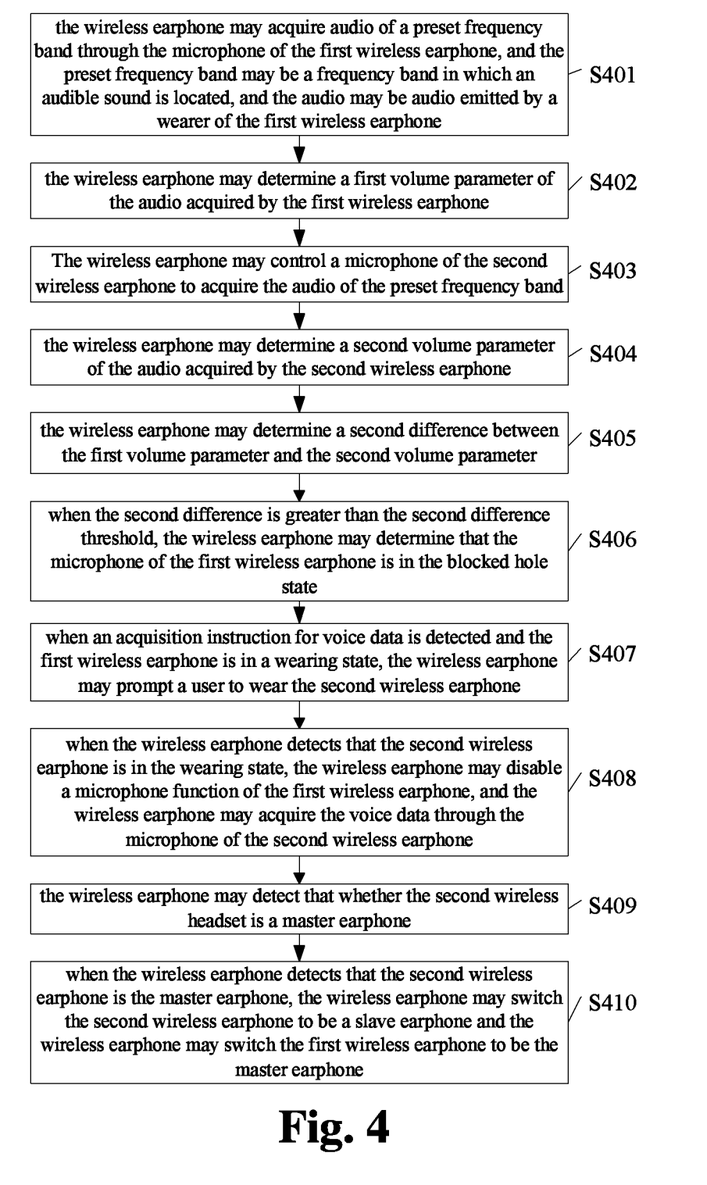
FIG. 4 is a flow chart of a microphone hole blockage detection method in accordance with an embodiment in the present disclosure.

In an embodiment same as the embodiment shown in FIG. 2, FIG. 4 illustrates a flow chart of a microphone hole blockage detection method in accordance with an embodiment in the present disclosure, as shown in the figure, the microphone hole blockage detection method may include operations in the following blocks.

Block S401, the wireless earphone may acquire audio of a preset frequency band through the microphone of the first wireless earphone, and the preset frequency band may be a frequency band in which an audible sound is located, and the audio may be audio emitted by a wearer of the first wireless earphone.

Block S402, the wireless earphone may determine a first volume parameter of the audio acquired by the first wireless earphone.

Block S403, the wireless earphone may control a microphone of the second wireless earphone to acquire the audio of the preset frequency band.

Block S404, the wireless earphone may determine a second volume parameter of the audio acquired by the second wireless earphone.

Block S405, the wireless earphone may determine a second difference between the first volume parameter and the second volume parameter.

Block S406, when the second difference is greater than the second difference threshold, the wireless earphone may determine that the microphone of the first wireless earphone is in the blocked hole state.

Block S407, when an acquisition instruction for voice data is detected and the first wireless earphone is in a wearing state, the wireless earphone may prompt a user to wear the second wireless earphone.

Block S408, when the wireless earphone detects that the second wireless earphone is in the wearing state, the wireless earphone may disable a microphone function of the first wireless earphone, and the wireless earphone may acquire the voice data through the microphone of the second wireless earphone.

Block S409, the wireless earphone may detect that whether the second wireless earphone is a master earphone.

Block S410, when the wireless earphone detects that the second wireless earphone is the master earphone, the wireless earphone may switch the second wireless earphone to be a slave earphone and the wireless earphone may switch the first wireless earphone to be the master earphone.

In this embodiment of the present disclosure, the wireless earphone may first obtain audio of the preset frequency band through the microphone of the first wireless earphone, and the preset frequency band may a frequency band in which an audible sound is located. Secondly, the first volume parameter of the audio acquired by the first wireless earphone may be determined. Finally, it may determine according to the first volume parameter that the microphone of the first wireless earphone is in the blocked hole state. The wireless earphone may obtain audio of the preset frequency band through the microphone, and the blocked hole state of the microphone may be determined according to the first volume parameter of the audio, which may be beneficial to improve convenience of the blocked hole detection. Moreover, due to universality of the audible sound, detecting the blocked hole state by acquiring the audible sound may improve time flexibility of the blocked hole detection. In addition, the entire detection process may be performed autonomously by the wireless earphone, which may realize an automatic detection of the blocked hole state of the wireless earphone microphone. It may detect that the microphone is in the blocked hole state without increasing a hardware structure, which may expand functions of the wireless earphone and improve intelligence of the blocked hole detection.

In addition, when the audio received by the wireless earphone is emitted by the wearer, because the wearer cannot accurately determine the volume of the audio emitted by the wearer, the second wireless earphone by may be controlled to acquire the audio together, and then the blocked hole state may be determined by determining the first volume parameter acquired by the first wireless earphone and the second volume parameter acquired by the second wireless earphone. The two wireless earphones may be in a same environment, which may help avoid environmental interference and further improve the accuracy of the blocked hole detection.

In addition, when the acquisition instruction for voice data is detected and the first wireless earphone is in the wearing state, the user may be prompt to wear the second wireless earphone. When the second wireless earphone being in the wearing state is detected, the microphone function of the first wireless earphone may be disabled, and the voice data through may be acquired the microphone of the second wireless earphone. It may be beneficial to improve integrity of voice data acquisition and reduce power consumption of the first wireless earphone.

In addition, when the wireless earphone determines that the microphone hole is blocked, the microphone function of the first wireless earphone may be disabled, and the microphone of the second wireless earphone may be used instead, which may cause the second wireless earphone to consume more power. Therefore, switching the second wireless earphone to the slave earphone may reduce the power consumption and energy consumption caused by a greater number of communication interactions of the master earphone, and may increase use time of the second wireless earphone.

In an embodiment same as the embodiment shown in FIG. 2, FIG. 3, and FIG. 4, FIG. 5 illustrates a structural illustration of a wireless earphone 500 in accordance with an embodiment in the present disclosure. The wireless earphone may include a first wireless earphone and a second wireless earphone. The first wireless earphone may include a microphone. As shown in the figure, the wireless earphone may include a processor 501, a memory 502, a communication interface 503, and at least one of programs 504. The at least one of programs 504 may be stored in the memory 502 and may be configured to be executed by the processor 501. The programs may include instructions configured to execute operations in the following.

Figure 5:
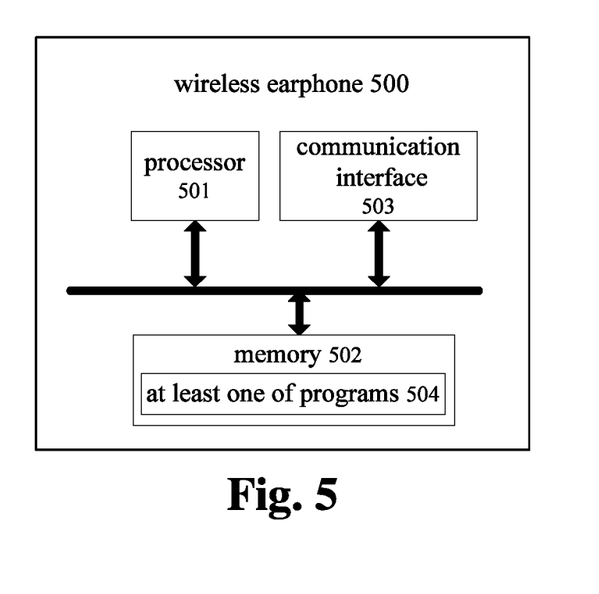
FIG. 5 is a structural illustration of a wireless earphone in accordance with an embodiment in the present disclosure.

Audio of a preset frequency band may be acquired through the microphone of the first wireless earphone, and the preset frequency band may be a frequency band in which an audible sound is located.

A first volume parameter of the audio acquired by the first wireless earphone, may be determined.

Whether the microphone of the first wireless earphone is in a blocked hole state may be determined according to the first volume parameter.

In this embodiment of the present disclosure, the wireless earphone may first obtain audio of the preset frequency band through the microphone of the first wireless earphone, and the preset frequency band may a frequency band in which an audible sound is located. Secondly, the first volume parameter of the audio acquired by the first wireless earphone may be determined. Finally, it may determine according to the first volume parameter that the microphone of the first wireless earphone is in the blocked hole state. The wireless earphone may obtain audio of the preset frequency band through the microphone, and the blocked hole state of the microphone may be determined according to the first volume parameter of the audio, which may be beneficial to improve convenience of the blocked hole detection. Moreover, due to universality of the audible sound, detecting the blocked hole state by acquiring the audible sound may improve time flexibility of the blocked hole detection. In addition, the entire detection process may be performed autonomously by the wireless earphone, which may realize an automatic detection of the blocked hole state of the wireless earphone microphone. It may detect that the microphone is in the blocked hole state without increasing a hardware structure, which may expand functions of the wireless earphone and improve intelligence of the blocked hole detection.

In an embodiment, in a case that whether the first wireless earphone is in the blocked hole state may be determined according to the first volume parameter, the instructions in the program 504 may be configured to execute operations in the following. A first difference between the first volume parameter and a preset volume threshold, may be determined. When the first difference being greater than the first difference threshold is detected, it may determine that the microphone of the first wireless earphone is in the blocked hole state.

In this embodiment, the wireless earphone may be coupled to the mobile terminal. The audio may be audio emitted by the speaker of the mobile terminal. The program 504 may be further configured to execute operations in the following. Before the first difference between the first volume parameter and the preset volume threshold is determined, a first distance parameter between the first wireless earphone and the mobile terminal, may be determined, and the preset volume threshold corresponding to the first distance parameter, may be acquired.

In an embodiment, the audio may be audio emitted by a speaker of the second wireless earphone according to the preset volume threshold. The program 504 may be further configured to execute operations in the following. Before the first difference being greater than the first difference threshold is detected, and before the first wireless earphone being in the blocked hole state is determined, a second distance parameter between the first wireless earphone and the second wireless earphone, may be determined, and the first difference threshold according to the second distance parameter, may be determined.

In an embodiment, the audio may be audio emitted by a wearer of the first wireless earphone. The microphone of the second wireless earphone may be in a non-blocked hole state. The program 504 may be further configured to execute operations in the following. The microphone of the second wireless earphone may be controlled to acquire the audio of the preset frequency band. A second volume parameter of the audio acquired by the second wireless earphone, may be determined.

In a case that whether the first wireless earphone is in the blocked hole state according to the first volume parameter, the program 504 may be further configured to execute operations in the following. A second difference between the first volume parameter and the second volume parameter, may be determined. When the second difference is greater than the second difference threshold, it may determine that the microphone of the first wireless earphone is in the blocked hole state.

In an embodiment, the program 504 may be further configured to execute operations in the following. After the first wireless earphone being in the blocked hole state is determined according to the first volume parameter, when an acquisition instruction for voice data is detected and the first wireless earphone is in a wearing state, a user may be prompted to wear the second wireless earphone, and when the second wireless earphone being in the wearing state is detected, a microphone function of the first wireless earphone may be disabled, and the voice data through may be acquired the microphone of the second wireless earphone.

In this embodiment, the program 504 may be further configured to execute operations in the following. After the voice data may be acquired through the microphone of the second wireless earphone, whether the second wireless earphone is a master earphone, may be detected, and when the second wireless earphone being the master earphone is detected, the second wireless earphone may be switched to be a slave earphone and the first wireless earphone may be switched to be the master earphone.

The above-mentioned description mainly introduces a solution of the embodiments of the present disclosure from the perspective of the execution process on the method side. It may be understood that, in order to implement the above-mentioned functions, the wireless earphone may include hardware structures and/or software modules corresponding to each function. Those skilled in the art should easily realize that in combination with the units and algorithm operations of the examples described in the embodiments provided herein, the present disclosure may be implemented in the form of hardware or a combination of hardware and computer software. Whether a function is executed by hardware or computer software-driven hardware depends on the specific application and design constraints of the technical solution. Professionals and technicians may use different methods for each specific application to implement the described functions, but such implementation should not be considered beyond the scope of this disclosure.

The embodiments of the present disclosure may divide the wireless earphone into functional units according to the above-mentioned embodiments. For example, each functional unit may be divided corresponding to each function, or two or more functions may be integrated into one processing unit. The above-mentioned integrated unit may be implemented in a form of hardware or software functional unit. It should be noted that the division of units in the embodiments of the present disclosure is illustrative, and is only a logical function division, and there may be other division methods in actual implementation.

Figure 6A:
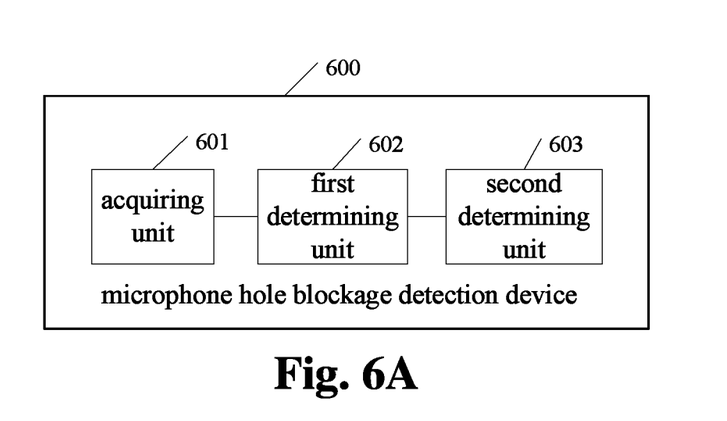
FIG. 6A is a functional unit block diagram of a microphone hole blockage detection device in accordance with an embodiment in the present disclosure.

FIG. 6A illustrates a functional unit block diagram of a microphone hole blockage detection device 600 in accordance with an embodiment in the present disclosure. The microphone hole blockage detection device 600 may be applied to a wireless earphone. The wireless earphone may include a first wireless earphone and a second wireless earphone. The first wireless earphone may include a microphone. The microphone hole blockage detection device 600 may include an acquiring unit 601, a first determining unit 602, and a second determining unit 603.

The acquiring unit 601 may be configured to acquire audio of a preset frequency band through the microphone of the first wireless earphone. The preset frequency band may be a frequency band in which an audible sound is located.

The first determining unit 602 may be configured to determine a first volume parameter of the audio acquired by the first wireless earphone.

The second determining unit 603 may be configured to determine that whether the microphone of the first wireless earphone is in a blocked hole state according to the first volume parameter.

In this embodiment of the present disclosure, the wireless earphone may first obtain audio of the preset frequency band through the microphone of the first wireless earphone, and the preset frequency band may a frequency band in which an audible sound is located. Secondly, the first volume parameter of the audio acquired by the first wireless earphone may be determined. Finally, it may determine according to the first volume parameter that the microphone of the first wireless earphone is in the blocked hole state. The wireless earphone may obtain audio of the preset frequency band through the microphone, and the blocked hole state of the microphone may be determined according to the first volume parameter of the audio, which may be beneficial to improve convenience of the blocked hole detection. Moreover, due to universality of the audible sound, detecting the blocked hole state by acquiring the audible sound may improve time flexibility of the blocked hole detection. In addition, the entire detection process may be performed autonomously by the wireless earphone, which may realize an automatic detection of the blocked hole state of the wireless earphone microphone. It may detect that the microphone is in the blocked hole state without increasing a hardware structure, which may expand functions of the wireless earphone and improve intelligence of the blocked hole detection.

In an embodiment, when the second determining unit 603 is configured to determine that whether the first wireless earphone is in the blocked hole state according to the first volume parameter, the second determining unit 603 may be further configured to determine a first difference between the first volume parameter and a preset volume threshold. When the first difference being greater than the first difference threshold is detected, the second determining unit 603 may be configured to determine that the microphone of the first wireless earphone is in the blocked hole state.

In this embodiment, the wireless earphone may be coupled to a mobile terminal. The audio may be audio emitted by a speaker of the mobile terminal. Before the second determining unit 603 determines the first difference between the first volume parameter and the preset volume threshold, the second determining unit 603 may be further configured to determine a first distance parameter between the first wireless earphone and the mobile terminal, and the second determining unit 603 may be further configured to acquire the preset volume threshold corresponding to the first distance parameter.

In an embodiment, the audio may be audio emitted by a speaker of the second wireless earphone according to the preset volume threshold. Before the second determining unit detects that the first difference is greater than the first difference threshold, the second determining unit may be configured to determine that the microphone of the first wireless earphone is in the blocked hole state, the second determining unit 603 is further configured to determine a second distance parameter between the first wireless earphone and the second wireless earphone, and the second determining unit 603 may be configured to determine the first difference threshold according to the second distance parameter.

In an embodiment, the audio may be audio emitted by a wearer of the first wireless earphone. A microphone of the second wireless earphone may be in a non-blocked hole state. The acquiring unit 601 may be further configured to control the microphone of the second wireless earphone to acquire the audio of the preset frequency band.

The first determining unit 602 may be configured to determine a second volume parameter of the audio acquired by the second wireless earphone.

When the second determining unit 603 is configured to determine that whether the microphone of the first wireless earphone is in a blocked hole state according to the first volume parameter, the second determining unit 603 may be further configured to determine a second difference between the first volume parameter and the second volume parameter. When the second difference is greater than the second difference threshold, the second determining unit 603 may be configured to determine that the microphone of the first wireless earphone is in the blocked hole state.

Figure 6B:
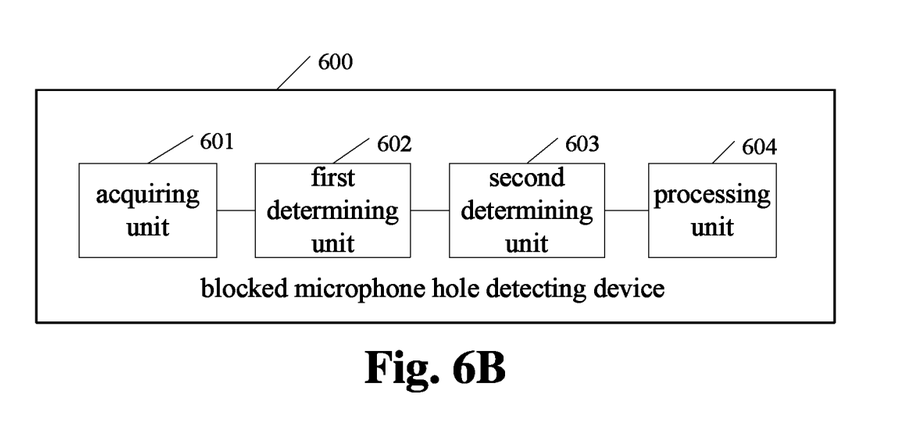
FIG. 6B is a functional unit block diagram of a microphone hole blockage detection device in accordance with an embodiment in the present disclosure.

In an embodiment, as shown in FIG. 6B, the microphone hole blockage detection device 600 may further include a processing unit 604. After the first wireless earphone being in the blocked hole state according to the first volume parameter is detected, the processing unit 604 may be configured to prompt a user to wear the second wireless earphone. When an acquisition instruction for voice data is detected and the first wireless earphone is in a wearing state, the processing unit 604 may be configured to acquire the voice data through the microphone of the second wireless earphone. When the second wireless earphone being in the wearing state is detected, the processing unit 604 may be configured to disable a microphone function of the first wireless earphone.

In this embodiment, after the processing unit 604 acquires the voice data through the microphone of the second wireless earphone, the processing unit 604 may be further configured to detect whether the second wireless earphone is a master earphone. When the second wireless earphone being the master earphone is detected, the processing unit 604 may be further configured to switch the second wireless earphone to be a slave earphone and the first wireless earphone to be the master earphone.

The acquiring unit 601 may be a speaker. The first determining unit 602, the second determining unit 603, and the processing unit 604 may be a processor or a transceiver.

In an embodiment, the present disclosure also provides a computer storage medium. The computer storage medium may be configured to store a computer program for electronic data exchange. The computer program may cause a computer to execute any of part or all of the operations in the above-mentioned embodiments of the microphone hole blockage detection method.

In an embodiment, the present disclosure also provides a computer program product. The computer program product may include a non-transitory computer-readable storage medium storing a computer program. The computer program may be operable to cause a computer to execute any of part or all of the operations in the above-mentioned embodiments of the microphone hole blockage detection method.

It should be noted that, for the above-mentioned method embodiments, for a simple description, the above-mentioned method embodiments are all expressed as a series of action combinations. However, those skilled in the art should know that the present disclosure is not limited by the described sequence of operations. Because according to the present disclosure is, some operations may be performed in other order or simultaneously. Those skilled in the art should also know that the embodiments described in the specification are all preferred embodiments. The operations and modules involved are not necessarily required by the present disclosure.

In the above-mentioned embodiments, the description of each embodiment has its own focus. For parts that are not described in detail in an embodiment, reference may be made to related descriptions of other embodiments.

In the several embodiments provided in the present disclosure, it should be understood that the disclosed device may be implemented in other ways. For example, the above-mentioned device embodiments are merely illustrative. For example, the division of the units is only a logical function division, and there may be other divisions in actual implementation, for example, multiple units or components may be combined or may be integrate into another system, or some features may be ignored or not implemented. In addition, the displayed or discussed mutual coupling or direct coupling or communication connection may be indirect coupling or communication connection through some interfaces, devices or units, and may be in electrical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit. The above-mentioned integrated unit may be implemented in the form of hardware or software functional unit.

When the integrated unit is implemented in the form of a software functional unit and sold or used as an independent product, it may be stored in a computer readable memory. Based on this understanding, the technical solution of the present disclosure essentially or the part that contributes to the existing technology, or all or part of the technical solution may be embodied in the form of a software product, and the computer software product is stored in a memory. It includes several instructions to make a computer device (which may be a personal computer, a server, or a network device, and so on) execute all or part of the operations in the above-mentioned embodiments of the microphone hole blockage detection method. The aforementioned memory includes: a USB stick, a read-only memory (ROM), a random access memory (RAM), a mobile hard disk, magnetic disk or optical disk and other media that may store program codes.

Those of ordinary skill in the art may understand that all or part of the operations in the various methods of the above-mentioned embodiments may be completed by instructing relevant hardware through a program. The program may be stored in a computer-readable memory. The memory may include: a flash disk, a read-only memory (ROM), a random access memory (RAM), a magnetic disk or an optical disk, and so on.

The embodiments of the present disclosure are described in detail above, and specific examples are used in this article to illustrate the principles and implementation of the present disclosure. The descriptions of the above-mentioned embodiments are only used to help understand the methods and core ideas of the disclosure. A person of ordinary skill in the art, based on the idea of the present disclosure, will have changes in the specific implementation and the scope of the present disclosure. In summary, the content of this specification should not be construed as a limitation to the present disclosure.

What is claimed is:

1. A method for microphone hole blockage detection applied to a wireless earphone, wherein the wireless earphone comprises a first wireless earphone and a second wireless earphone; the first wireless earphone comprises a microphone; and the method comprises:
    acquiring audio of a preset frequency band through the microphone of the first wireless earphone, wherein the preset frequency band is a frequency band in which an audible sound is located;
    determining a first volume parameter of the audio acquired by the first wireless earphone; and
    determining whether the microphone of the first wireless earphone is in a blocked hole state according to the first volume parameter;
    wherein in response to determining that the microphone of the first wireless earphone is in the blocked hole state according to the first volume parameter, the method further comprises:
        when an acquisition instruction for voice data is detected and the first wireless earphone is in a wearing state, prompting a user to wear the second wireless earphone; and
        when the second wireless earphone being in the wearing state is detected, disabling a microphone function of the first wireless earphone, and acquiring the voice data through the microphone of the second wireless earphone.

2. The method of claim 1, wherein the determining whether the microphone of the first wireless earphone being in the blocked hole state according to the first volume parameter, comprises:
    determining a first difference between the first volume parameter and a preset volume threshold; and
    when the first difference being greater than a first difference threshold is detected, determining that the first wireless earphone is in the blocked hole state.

3. The method of claim 2, wherein before the determining the first difference between the first volume parameter and the preset volume threshold, the method further comprises:
    acquiring ambient volume; and
    determining that volume threshold corresponding to the ambient volume is the preset volume threshold.

4. The method of claim 2, wherein the wireless earphone is coupled to a mobile terminal; the audio is audio emitted by a speaker of the mobile terminal; before the determining the first difference between the first volume parameter and the preset volume threshold, the method further comprises:
    determining a first distance parameter between the first wireless earphone and the mobile terminal; and
    acquiring the preset volume threshold corresponding to the first distance parameter.

5. The method of claim 2, wherein the audio is audio emitted by a speaker of the second wireless earphone according to the preset volume threshold; before the when the first difference being greater than the first difference threshold is detected, determining that the first wireless earphone is in the blocked hole state, the method further comprises:
    determining a second distance parameter between the first wireless earphone and the second wireless earphone; and
    determining the first difference threshold according to the second distance parameter.

6. The method of claim 1, wherein the audio is audio emitted by a wearer of the first wireless earphone, and a microphone of the second wireless earphone is in a non-blocked hole state; the method further comprises:
  controlling the microphone of the second wireless earphone to acquire the audio of the preset frequency band; and
  determining a second volume parameter of the audio acquired by the second wireless earphone;
  the whether the microphone of the first wireless earphone being in the blocked hole state according to the first volume parameter, comprises:
  determining a second difference between the first volume parameter and the second volume parameter;
  when the second difference is greater than a second difference threshold, determining that the microphone of the first wireless earphone is in the blocked hole state.

7. The method of claim 1, wherein after the acquiring the voice data through the microphone of the second wireless earphone, the method further comprises:
  detecting that whether the second wireless earphone is a master earphone; and
  when the second wireless earphone being the master earphone is detected, switching the second wireless earphone to be a slave earphone and the first wireless earphone to be the master earphone.

8. The method of claim 1, wherein the second wireless earphone being in the wearing state being detected, comprises:
  acquiring a posture parameter of the second wireless earphone; and
  detecting that the second wireless earphone is in the wearing state according to the posture parameter of the second wireless earphone.

9. A device for microphone hole blockage detection applied to a wireless earphone, wherein the wireless earphone comprises a first wireless earphone and a second wireless earphone; the first wireless earphone comprises a microphone; the microphone hole blockage detection device comprises an acquiring unit, a first determining unit, a second determining unit, and a processing unit;
  wherein the acquiring unit is configured to acquire audio of a preset frequency band through the microphone of the first wireless earphone, wherein the preset frequency band is a frequency band in which an audible sound is located;
  wherein the first determining unit is configured to determine a first volume parameter of the audio acquired by the first wireless earphone;
  wherein the second determining unit is configured to determine that whether the microphone of the first wireless earphone is in a blocked hole state according to the first volume parameter; and
  wherein in response to determining the first wireless earphone being in the blocked hole state according to the first volume parameter, the processing unit is further configured to prompt a user to wear the second wireless earphone; when an acquisition instruction for voice data is detected and the first wireless earphone is in a wearing state, the processing unit is configured to acquire the voice data through the microphone of the second wireless earphone; and when the second wireless earphone being in the wearing state is detected, the processing unit is configured to disable a microphone function of the first wireless earphone.

10. The device of claim 9, wherein the second determining unit is further configured to determine a first difference between the first volume parameter and a preset volume threshold; and when the first difference being greater than a first difference threshold is detected, the second determining unit is configured to determine that the microphone of the first wireless earphone is in the blocked hole state.

11. The device of claim 10, wherein before the acquiring unit is configured to determine the first difference between the first volume parameter and the preset volume threshold, the acquiring unit is further configured to acquire ambient volume; and
  the second determining unit is further configured to determine that volume threshold corresponding to the ambient volume is the preset volume threshold.

12. The device of claim 10, wherein the wireless earphone is coupled to a mobile terminal; the audio is audio emitted by a speaker of the mobile terminal; before the second determining unit determines the first difference between the first volume parameter and the preset volume threshold, the second determining unit is further configured to determine a first distance parameter between the first wireless earphone and the mobile terminal; and the second determining unit is further configured to acquire the preset volume threshold corresponding to the first distance parameter.

13. The device of claim 10, wherein the audio is audio emitted by a speaker of the second wireless earphone according to the preset volume threshold; before the second determining unit detects that the first difference is greater than the first difference threshold, the second determining unit is configured to determine that the microphone of the first wireless earphone is in the blocked hole state, the second determining unit is further configured to determine a second distance parameter between the first wireless earphone and the second wireless earphone; and the second determining unit is configured to determine the first difference threshold according to the second distance parameter.

14. The device of claim 9, wherein the audio is audio emitted by a wearer of the first wireless earphone, and a microphone of the second wireless earphone is in a non-blocked hole state; the acquiring unit is further configured to control the microphone of the second wireless earphone to acquire the audio of the preset frequency band;
  the first determining unit is configured to determine a second volume parameter of the audio acquired by the second wireless earphone; and
  the second determining unit is further configured to determine a second difference between the first volume parameter and the second volume parameter; and when the second difference is greater than a second difference threshold, the second determining unit is configured to determine that the microphone of the first wireless earphone is in the blocked hole state.

15. The device of claim 9, wherein after the processing unit acquires the voice data through the microphone of the second wireless earphone, the processing unit is further configured to detect whether the second wireless earphone is a master earphone; and when the second wireless earphone being the master earphone is detected, the processing unit is further configured to switch the second wireless earphone to be a slave earphone and the first wireless earphone to be the master earphone.

16. The device of claim 9, wherein the processing unit is further configured to acquire a posture parameter of the second wireless earphone; and the processing unit is further configured to detect that the second wireless earphone is in the wearing state according to the posture parameter of the second wireless earphone.

17. A wireless earphone, comprising: a processor, a memory, a first wireless earphone, a second wireless earphone, and at least one program; the first wireless earphone comprises a microphone; the at least one program is stored in the memory and configured to be executed by the processor; the at least one program comprises instructions configured to execute operations comprising:

acquiring audio of a preset frequency band through the microphone of the first wireless earphone, wherein the preset frequency band is a frequency band in which an audible sound is located;

determining a first volume parameter of the audio acquired by the first wireless earphone; and determining whether the microphone of the first wireless earphone is in a blocked hole state according to the first volume parameter;

wherein in response to determining that the microphone of the first wireless earphone is in the blocked hole state according to the first volume parameter, the instructions are further configured to execute operations comprising:

when an acquisition instruction for voice data is detected and the first wireless earphone is in a wearing state, prompting a user to wear the second wireless earphone; and when the second wireless earphone being in the wearing state is detected, disabling a microphone function of the first wireless earphone, and acquiring the voice data through the microphone of the second wireless earphone.

18. The wireless earphone of claim 17, wherein the determining whether the microphone of the first wireless earphone being in the blocked hole state according to the first volume parameter, comprises:

determining a first difference between the first volume parameter and a preset volume threshold; and when the first difference being greater than the first difference threshold is detected, determining that the first wireless earphone is in the blocked hole state.

* * * * *